United States Patent
Kitamura et al.

(10) Patent No.: US 7,191,668 B2
(45) Date of Patent: *Mar. 20, 2007

(54) TORQUE MEASURING DEVICE FOR ROTATING BODY HAVING LIGHT CONDUCTIVE MEMBER PROVIDED WITH OPTICAL PATH CONVERTING MEANS

(75) Inventors: Atsushi Kitamura, Shizuoka-ken (JP); Shigeyuki Adachi, Shizuoka-ken (JP); Sawa Tanabe, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 59 days.

This patent is subject to a terminal disclaimer.

(21) Appl. No.: 11/112,609

(22) Filed: Apr. 22, 2005

(65) Prior Publication Data

US 2005/0252310 A1    Nov. 17, 2005

(30) Foreign Application Priority Data

May 11, 2004  (JP)  ............................... 2004-140815

(51) Int. Cl.
*G01L 3/02* (2006.01)
(52) U.S. Cl. ............................ 73/862.324; 73/862.325; 73/862.331; 73/862.335; 73/862
(58) Field of Classification Search ............ 73/862.324, 73/862.325, 862.331, 862.338
See application file for complete search history.

(56) References Cited

U.S. PATENT DOCUMENTS

| 4,314,283 A | 2/1982 | Kramer |
| 4,749,248 A | 6/1988 | Aberson, Jr. et al. |
| 6,472,656 B2 * | 10/2002 | Arai .................... 250/231.14 |
| 6,504,275 B2 * | 1/2003 | Nondahl et al. ........ 310/68 B |
| 6,624,900 B1 * | 9/2003 | Eisenhauer et al. ........ 356/614 |
| 6,800,843 B2 * | 10/2004 | Horton ................. 250/231.13 |
| 6,895,827 B2 * | 5/2005 | Arai ...................... 73/862.324 |
| 6,907,794 B2 * | 6/2005 | Arai ...................... 73/862.324 |
| 7,009,771 B2 * | 3/2006 | Bourdelais et al. ........ 359/599 |
| 7,066,035 B2 * | 6/2006 | Arai ...................... 73/862.324 |
| 2002/0000513 A1 * | 1/2002 | Arai .................... 250/231.13 |

(Continued)

FOREIGN PATENT DOCUMENTS

EP    1 170 577 A2    1/2002

(Continued)

*Primary Examiner*—Edward Lefkowitz
*Assistant Examiner*—Freddie Kirkland, III
(74) *Attorney, Agent, or Firm*—McDermott Will & Emery LLP (57) ABSTRACT

A torque measuring device for a rotating body comprises: a rotary section including first and second flanges provided respectively at driving and driven sides, and a hollow cylinder provided between the first and second flanges; light emitting elements provided at an outer circumference of the rotary section, and adapted to emit light based on output from each of torque detectors provided at an inner surface of the hollow cylinder thereby sending an optical signal; a light conductive member to receive the optical signal at a light receiving surface thereof, and to guide the optical signal along its longitudinal directions; and a torque calculator to calculate torque of the rotary section based on the optical signal guided by the light conductive member, wherein the light conductive member has an optical path converting means formed at either the light receiving surface or a surface thereof opposite to the light receiving surface.

5 Claims, 6 Drawing Sheets

U.S. PATENT DOCUMENTS

| | | | |
|---|---|---|---|
| 2004/0123678 A1* | 7/2004 | Arai | 73/862.324 |
| 2004/0139807 A1* | 7/2004 | Arai | 73/862.324 |
| 2004/0187603 A1* | 9/2004 | Arai | 73/862.324 |
| 2004/0187604 A1* | 9/2004 | Arai | 73/862.324 |
| 2006/0043273 A1* | 3/2006 | Kitamura et al. | 250/231.13 |

FOREIGN PATENT DOCUMENTS

| | | |
|---|---|---|
| EP | 1 170 577 A3 | 1/2002 |
| EP | 1 462 827 A1 | 9/2004 |
| JP | 2002-022566 | 1/2002 |

* cited by examiner

TORQUE MEASURING DEVICE FOR ROTATING BODY HAVING LIGHT CONDUCTIVE MEMBER PROVIDED WITH OPTICAL PATH CONVERTING MEANS

CROSS-REFERENCE TO RELATED APPLICATIONS

This application claims priority from Japanese Appln. No. 2004-140815, filed May 11, 2004.

FEDERALLY SPONSORED RESEARCH OR DEVELOPMENT

Not applicable.

TECHNICAL FIELD

The invention relates to a torque measuring device for a rotating body to measure a torque of a rotating body without getting in touch with its rotating portion, and more particularly to a torque measuring device for a rotating body, in which improvement of workability in attaching a light conductive member and efficiency in receiving an optical signal is sought.

BACKGROUND OF THE INVENTION

A torque measuring device for a rotating body is set between a driving shaft powered and a driven shaft loaded, and measures a rotating torque in a non-contact manner. Such a torque measuring device is disclosed in, for example, Japanese Patent Application Laid-Open No. 2002-22566, which is used, for example, to measure a rotating torque between a measurement roller and a brake system in a chassis dynamo rotated by a wheel of a vehicle.

Figure 1:
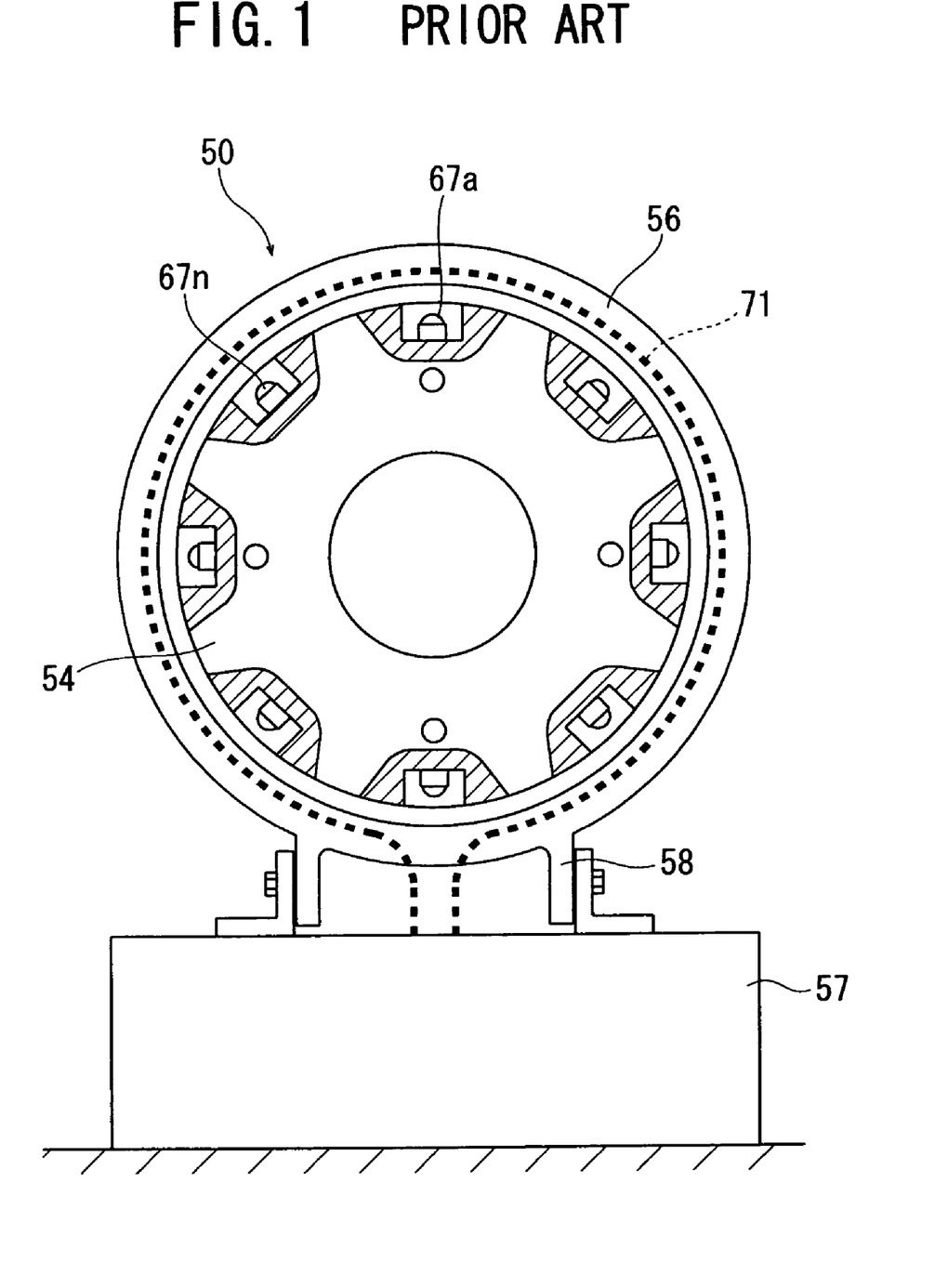
FIG. 1 is a front view of a conventional torque measuring device for a rotating body.
Figure 2:
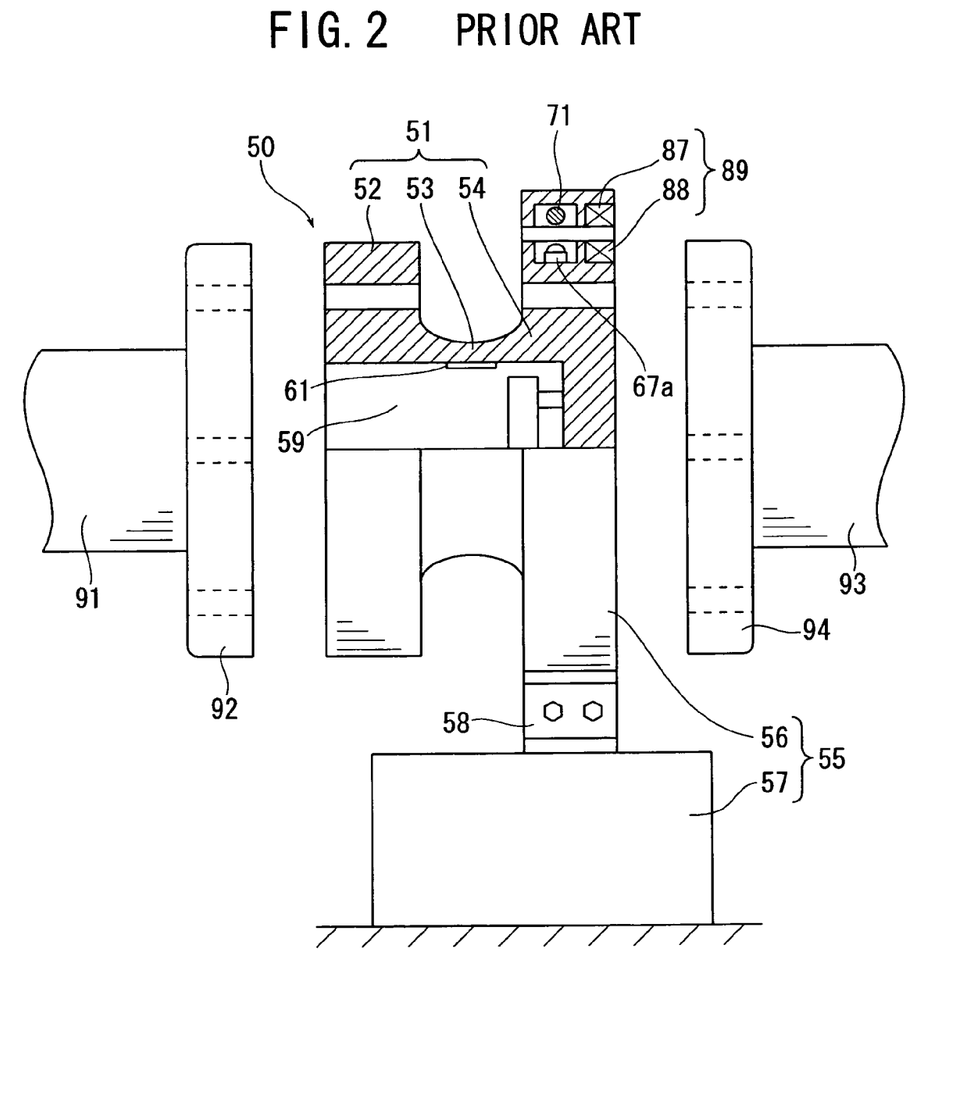
FIG. 2 is a side view (partly cut away and sectioned) of the conventional torque measuring device for a rotating body shown in FIG. 1.

In Japanese Patent Appln. Laid-Open No. 2002-22566, FIG. 1 is a front view of a conventional torque measuring device 50 for a rotating body, and FIG. 2 is a side view (partly cut away and sectioned) of the conventional torque measuring device 50 of FIG. 1. As shown in FIGS. 1 and 2, the conventional torque measuring device 50 comprises: a rotary section 51 rotatably disposed between a driving shaft 91 powered and a driven shaft 93 loaded; and a stationary section 55 fixedly disposed so as to surround the rotary section 51. The rotary section 51 integrally comprises: a first flange 52 to be fixedly jointed to a driving shaft flange 92 of the driving shaft 91; a second flange 54 to be fixedly jointed to a driven shaft flange 94 of the driven shaft 93; and a hollow cylinder 53 having a hollow 59, and having the first and second flanges 52 and 54 formed respectively on both edges thereof. The stationary section 55 comprises: an annulus 56 located so as to surround the second flange 54; and a chassis 57 to which the annulus 56 is fixedly attached via attaching members 58.

A primary coil 87 is provided at the inner circumference of the annulus 56 disposed outside the second flange 54, and a secondary coil 88 is provided at the outer circumference of the second flange 54. The primary and secondary coils 87 and 88 in combination constitute a rotary transformer 89, thereby supplying electric power to the rotary section 51.

Torque detectors 61 as strain gauges are provided at the inner circumference of the hollow cylinder 53, a plurality of light emitting elements 67a to 67n, which are adapted to emit light according to an output from the torque detectors 61 thereby outputting an optical signal, are provided at the outer circumference of the second flange 54 so as to be arrayed along the secondary coil 88, a light receiving fiber 71 for receiving the optical signal from the light emitting elements 67a to 67n is provided along the primary coil 87 on the inner circumference of the annulus 56, and optical-electrical signal converters (not shown) for converting the optical signal into an electrical signal are provided at the ends of the light receiving fiber 71.

In the torque measuring device 50, when the driving shaft 91 rotates, the output from the torque detectors 61 is carried via the light emitting elements 67a to 67n and the light receiving fiber 71 to the optical-electrical signal converters (not shown) and is thereby detected, thus measuring a rotating torque.

As described above, the torque measuring device 50 for a rotating body is set between the driving shaft 91 and the driven shaft 93 and is capable of measuring a rotating torque in a non-contact manner. In such a torque measuring system, if the light receiving fiber 71 to receive the output from light emitting elements 67a to 67n is scratched or damaged, the optical signal carried therethrough may possibly be impaired, and therefore the light receiving fiber 71 must be carefully fitted in the groove at the annulus 56 thus ever seeking improvement of workability in fitting the optical components.

And, since the light receiving fiber 71 which is disposed in a circle is adapted to receive the optical signal from the light emitting elements 67a to 67n from the center of the circle, and since the light receiving fiber 71 is adapted to transmit the received optical signal therethrough in a circular way, the optical signal received is not smoothly transmitted, and therefore improvement of efficiency in receiving the optical signal is also sought.

Under the circumstances described above, an invention to address the improvements sought was made by the present applicant under Japanese Patent Application No. 2003-90334.

The present invention is provided to solve the problems discussed above and other problems, and to provide advantages and aspects not provided by prior invention of this type. A full discussion of the features and advantages of the present invention is deferred to the following detailed description, which proceeds with reference to the accompanying drawings.

SUMMARY OF THE INVENTION

The present invention has been made such that the present inventors have further developed the aforementioned invention, the present invention provides a torque measuring device for a rotating body, in which efficiency in receiving an optical signal is further improved while keeping workability.

According to one aspect of the present invention, a torque measuring device for a rotating body comprises: a rotary section including a first flange provided at a driving side, a second flange provided at a driven side, and a hollow cylinder provided between the first and second flanges; a plurality of light emitting elements provided at an outer circumference of the rotary section, and functioning to emit light based on output from each of torque detectors provided at an inner surface of the hollow-cylinder thereby sending an optical signal; a light conductive member to receive the optical signal at a light receiving surface thereof facing toward the rotary section, and to guide the optical signal along its longitudinal directions; and a torque calculator to calculate torque of the rotary section based on the optical signal guided by the light conductive member, wherein the light conductive member has an optical path converting means formed at one of the light receiving surface and a surface thereof opposite to the light receiving surface. Consequently, efficiency in receiving an optical signal is further improved, whereby components for converting an optical signal into an electrical signal, such as a high-speed OP amplifier, and a light receiving element, can be reduced in cost and also in usage quantity thus contributing to cost reduction of the device. And, since the light conducive member can be downsized, the device can be also downsized.

In the one aspect of the present invention, the optical path converting means may be constituted by roughening either the light receiving surface of the light conductive member or the surface thereof opposite to the light receiving surface. Consequently, the optical path converting means can be easily formed for achieving efficient light conduction.

In the one aspect of the present invention, the optical path converting means may be constituted by a plurality of grooves each defining inclined planes. Consequently, the optical path converting means can be easily formed for achieving efficient light conduction.

In the one aspect of the present invention, the plurality of grooves each defining inclined planes may have their ridges extending in a direction orthogonal to a longitudinal direction of the light conductive member. Consequently, light can be conducted efficiently.

In the one aspect of the present invention, the plurality of grooves each defining inclined planes may have one of a triangular cross section and a trapezoidal cross section. Consequently, the optical path converting means can be easily formed for achieving efficient light conduction.

In the one aspect of the present invention, the light receiving surface of the light conductive member and the surface opposite to the light receiving surface may be parallel to each other. Consequently, the optical path converting means can be easily formed for achieving efficient light conduction.

In the one aspect of the present invention, the light conductive member may be attached to a chassis disposed outside the rotary section. Consequently, the light conductive member can be easily attached enhancing workability.

In the one aspect of the present invention, a light reflecting member may be provided at the surface of the light conductive member opposite to the light receiving surface. Consequently, light can be conducted further efficiently.

Accordingly, the torque measuring device for a rotating body according to the present invention comes up with further improved efficiency in receiving and conducting light.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 3:
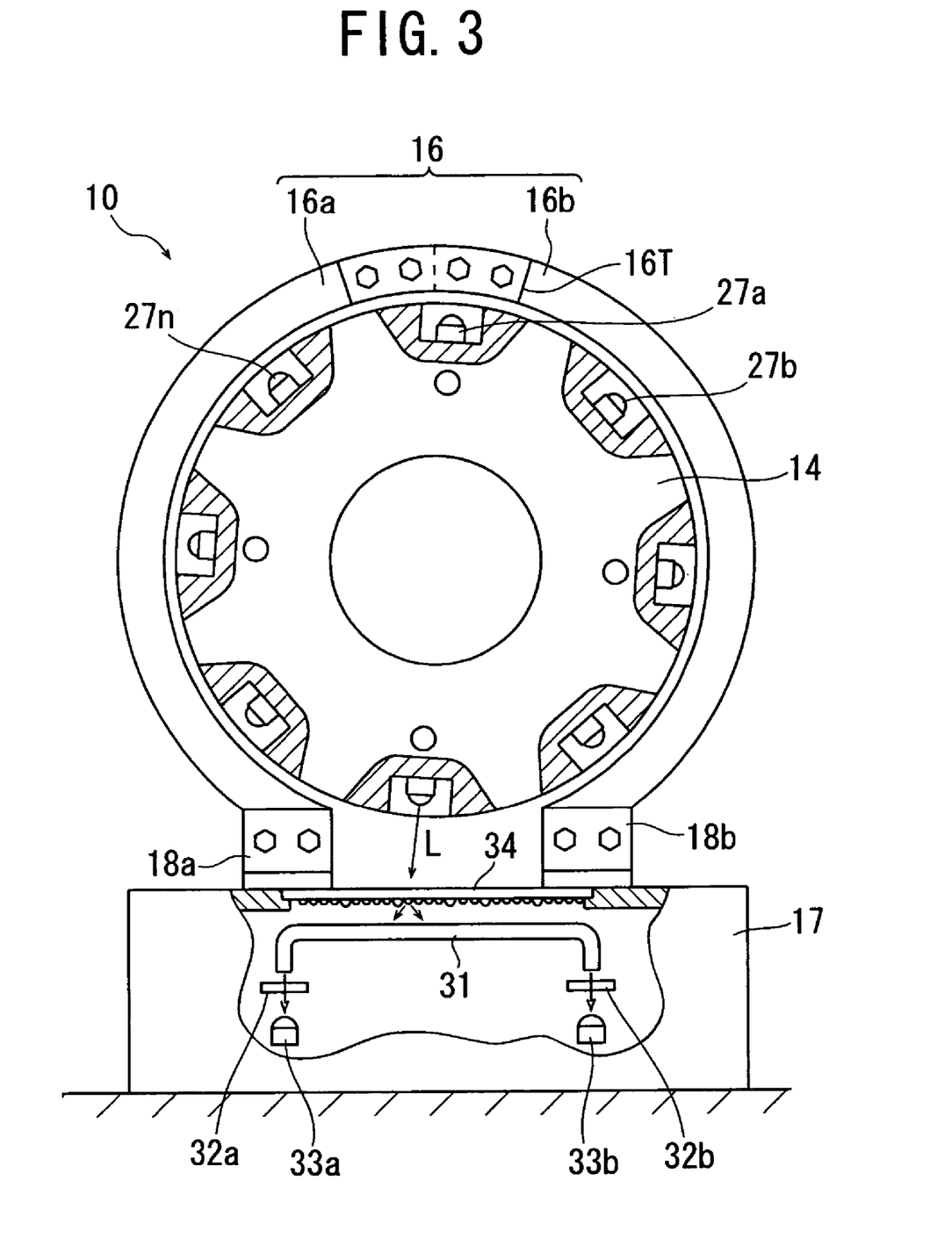
FIG. 3 is a front view of a torque measuring device for a rotating body as a reference example (in Japanese Patent Application No. 2003-90334)
Figure 4:
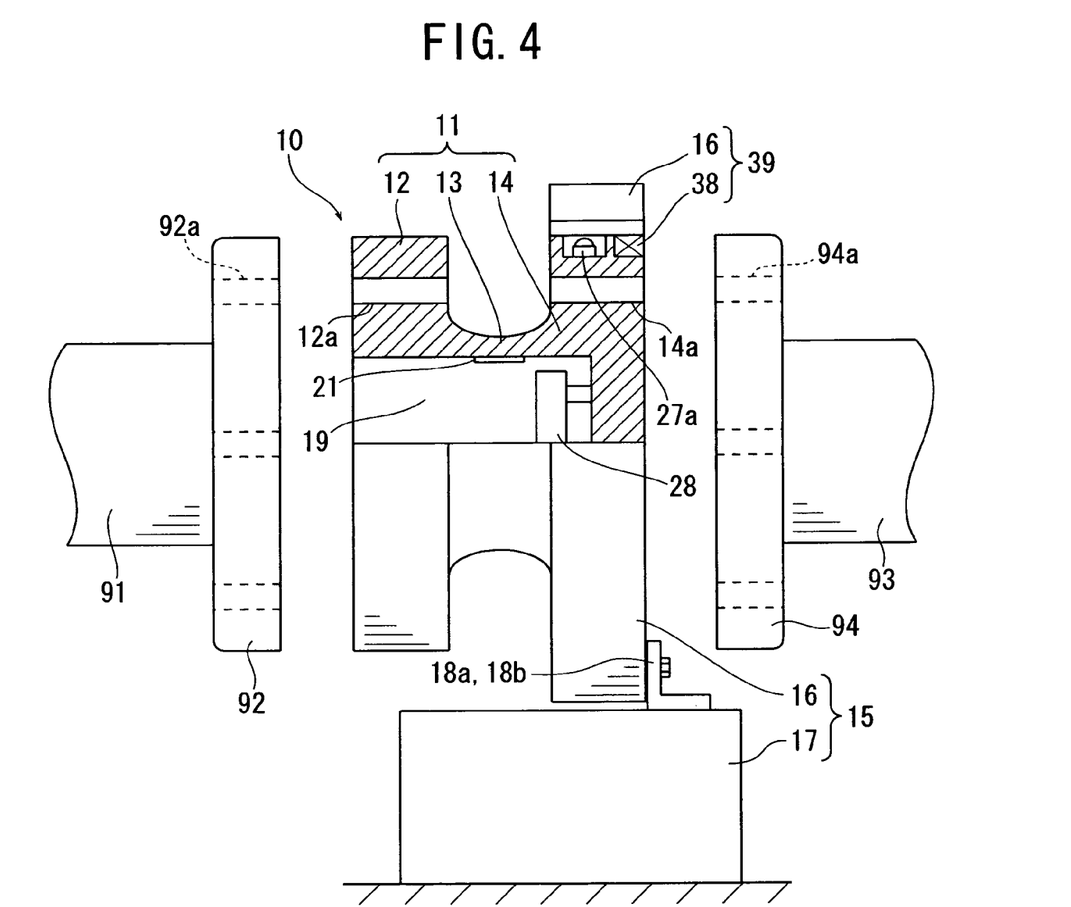
FIG. 4 is a side view (partly cut away and sectioned) of the torque measuring device for a rotating body shown in FIG. 3.

The present invention results from the further development of an invention disclosed in Japanese Patent Application No. 2003-90334 (hereinafter the invention is referred to as a reference example), and therefore the description will begin with an explanation of the reference example. Referring to FIGS. 3 and 4, a torque measuring device 10 for a rotating body as the reference example comprises: a rotary section 11 rotatably disposed between a driving shaft 91 powered and a driven shaft 93 loaded; and a stationary section 15 fixedly disposed so as to surround the rotary section 11. The rotary section 11 integrally comprises: a first flange 12 to be fixedly jointed to a driving shaft flange 92 of the driving shaft 91; a second flange 14 to be fixedly jointed to a driven shaft flange 94 of the driven shaft 93; and a hollow cylinder 13 having a hollow 19, and having the first and second flanges 12 and 14 formed respectively on both edges thereof. The stationary section 15 comprises: an annulus 16 located so as to surround the second flange 14; and a chassis 17 to which the annulus 16 is fixedly attached via attaching members 18a and 18b.

The first flange 12 is fixed to the driving shaft flange 92 by screws (not shown) going through lug-holes 92a of the driving shaft flange 92 and engaging into screw-holes 12a of the first flange 12, and the second flange 14 is fixed to the driven shaft flange 94 by screws (not shown) going through lug-holes 94a of the driven shaft flange 94 and engaging into screw-holes 14a of the second flange 14. When the driving shaft 91 rotates, the hollow cylinder 13 is twisted by the first and second flanges 12 and 14 and thus distorted The annulus 16 consists of two semi-annulus sections 16a and 16b which have their respective upper ends fixedly attached to each other by means of a conductive connecting member 16T so as to be electrically conductive to each other, and which have their respective lower ends fixedly attached to the attaching members 18a and 18b fixed to the chassis 17 so as to be physically and electrically isolated from each other. Thus, the annulus 16 is shaped into an interrupted loop with an open mouth and fixedly disposed in an insulating manner, and therefore constitutes a primary coil while it can be easily mounted and dismounted. The primary coil thus constituted and a secondary coil 38 provided at the outer circumference of the second flange 14 make up a rotary transformer 39 thereby supplying electric power to the rotary section 11.

Torque detectors 21 as strain gauges are provided at the inner circumference of the hollow cylinder 13, and a plurality of light emitting elements 27a to 27n adapted to emit light according to an output from the torque detectors 21 so as to send an optical signal L are provided at the outer circumference of the second flange 14. A light receiving fiber 31, as a light conductive member, which is straight and has both its end portions bent at right angles is fixedly disposed in the chassis 17 so as to receive the optical signal L sent from the light emitting elements 27a to 27n. Also, a light diffusing plate 34 which transmits and diffuses the optical signal L as well as prevents the invasion of oil mists and dusts and protects the light receiving fiber 31 is attached to the chassis 17.

Optical-electrical signal converters 33a and 33b adapted to receive the optical signal L and convert it into an electrical signal are provided so as to respectively face both end surfaces of the light receiving fiber 31 with optical high-pass filters 32a and 32b disposed therebetween. The rotary section 11 has a mounting board 28 provided in the hollow 19 of the hollow cylinder 13, and electronic components for the rotary section 11 are mounted on the mounting board 28.

In the reference example described above, the optical signal L sent from each of the light emitting elements 27a to 27n is diffused by the light diffusing plate 34 and received by the light receiving fiber 31. The optical signal L received is transmitted through the light receiving fiber 31 in both directions thereby achieving improvement in light receiving efficiency.

The present inventors have further advanced the reference example in order to achieve further improvement in light receiving efficiency. In the torque measuring device 10 for a rotating body according to the reference example explained with reference to FIGS. 3 and 4, the light receiving fiber 31 receives the optical signal L from each of the light emitting elements 27a to 27n, and the optical signal L received is detected via the optical-electrical signal converters 33a and 33b disposed so as to face the end surfaces of the light receiving fiber 31. On the other hand, in a torque measuring device for a rotating body according to the present invention, a light guide rod is disposed in place of the light receiving fiber 31. Other components are identical with those in the reference example shown in FIGS. 3 and 4, and therefore FIGS. 3 and 4 as well as relevant drawings will be referred to for the following discussion of the present invention.

Figure 5A:
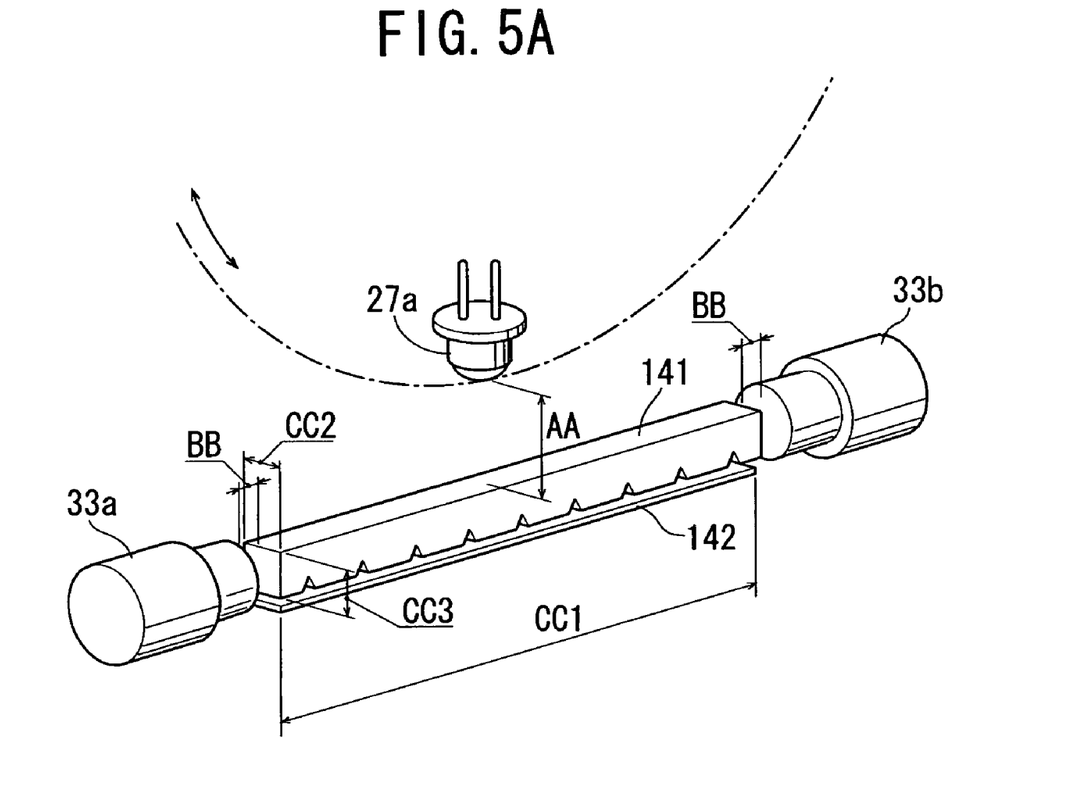
FIG. 5A is a perspective view of a relevant portion of a torque measuring device for a rotating body according to a first embodiment of the present invention.

Referring to FIG. 5A, in a torque measuring device for a rotating body according to a first embodiment of the present invention, a light guide rod 141 as a light conductive member receives an optical signal L from each of a plurality of light emitting elements 27a to 27n, and guides the optical signal L in both its longitudinal directions toward both end surfaces thereof. Both optical signals L thus guided are respectively received by optical-electrical signal converters 33a and 33b disposed so as to respectively face the both end surfaces of the light guide rod 141, and are thereby converted into electrical signals thus signal detection is performed. Torque generated when a rotary section 11 is rotated is computed by a torque calculating unit (not shown) of the torque measuring device based on the electrical signals produced by the optical-electrical signal converters 33a and 33b.

Figure 5B:
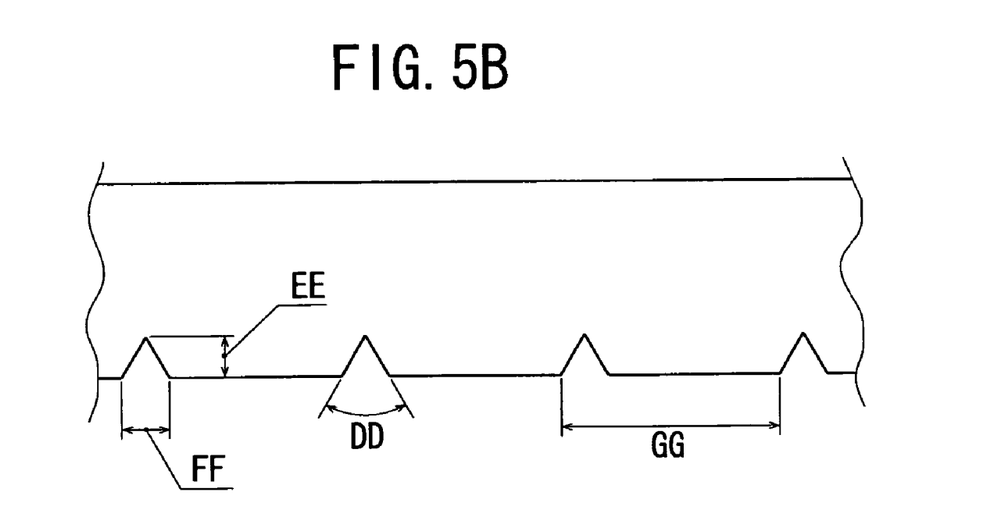
FIG. 5B is a side view of a part of a light guide rod shown in FIG. 5A.

Referring to FIGS. 5A and 5B, the light guide rod 141 is made of a transparent material and shaped substantially into a rectangular pole. A plurality of grooves as an optical path converting means are formed on a surface (lower side in the figures) the light guide rod 141 opposite to a surface (upper side in the figures) adapted to receive the optical signal L from the light emitting elements 27a to 27n, so as to run in the width direction of the light guide rod 141.

The light guide rod 141 which is shaped in a straight bar in the present invention may alternatively be shaped in, for example, a loop bar like the light receiving fiber 71 shown in FIG. 1 so as to substitute the light receiving fiber 71 in the conventional torque measuring device for a rotating body. In the present embodiment, the light guide rode 141 has upper and lower surfaces thereof arranged parallel to each other, and has also both side surfaces thereof arranged parallel to each other.

The light guide rod 141 may be made of any material that transmits light efficiently, and acrylic resin is most suitable in view of translucency and workability. The material, however, is not limited thereto, and the light guide rod 141 may be made of thermoplastic transparent resin, such as polyvinyl chloride resin, polycarbonate resin, olefin resin, styrene resin, and the like. Also, thermosetting transparent resin, such as epoxy resin and allyldiglycol carbonate resin, or inorganic transparent material such as glass may be employed in some cases.

The light guide rod 141 may be fabricated by machining method such as cutting and grinding, or molding method such as casting, hot pressing, extrusion molding, and injection molding. Injection molding method using resin material is most suitable in view of productivity.

The optical path converting means formed on the lower surface of the light guide rod 141 does not have to be constituted by the plurality of grooves as shown in FIGS. 5A and 5B and may alternatively be structured, for example, such that the lower surface is partly roughened, silk-screened, or provided with dot protrusions or dome protrusions. The lower surface of the light guide rod 141 may be roughened by directly sandblasting, or such that the surface of a resin injection molding die corresponding to the lower surface is previously roughened by sandblasting or etching whereby the light guide rod 141, when molded, comes out with the optical path converting means.

The grooves constituting the optical path converting means have a triangular cross section as shown in FIG. 5B, but may alternatively have a rectangular, for example trapezoidal cross section, or a polygonal cross section other than triangular or rectangular. Also, the inclined planes of the grooves may be flat or curved.

In the present embodiment, a light reflecting member 142 is provided so as to face the lower surface of the light guide rod 141. The light reflecting member 142 may be made of, for example, a film evaporated with silver or other metals, a white film, a film or sheet with white paint, or an aluminum or other metal sheet mirror-finished. The light reflecting member 142 may be provided at the side surfaces of the light guide rod 141 in addition to at the lower surface.

The light guide rod 141 has a length CC1, a width CC2, and a height CC3 as shown in FIG. 5A. And the grooves as the optical path converting means have an angle DD, a depth EE and a width FF and are arrayed at an interval GG as shown in FIG. 3B.

The optical-electrical signal converter 33a is disposed at a distance BB from one end surface of the light guide rod 141, and the optical-electrical signal converter 33b is disposed at a distance equal to the distance BB from the other end surface of the light guide rod 141.

The light diffusing plate 34 and the high-pass filters 32a and 32b that are shown in FIG. 3 are not shown in the present embodiment. These members may be provided or not in the present invention.

The present inventors conducted an experiment for comparing the reference example employing a light receiving fiber (referred to as "POF system") and the present embodiment employing the light guide rod 141 (referred to as "GR system") for the purpose of verifying the advantageous effects of the present invention. In this experiment, the light reflecting member 142 is provided at the lower surface of the light guide rod 141.

The measurement results of the comparison experiment between the POF system and the GR system are shown in Table 1 below.

TABLE 1

|  | Light uptake amount [μW] | Improvement ratio (POF system = 1) |
|---|---|---|
| POF system | 10.2 | 1 |
| GR system | 133.3 | 13.1 |

In the experiment, the GR system was arranged such that the length CC1, the width CC2, and the height CC3 of the light guide rod 141 were 60 mm, 1 mm, and 3 mm, respectively, and the angle DD, the depth EE, the width FF, and the interval GG of the grooves were 72 degrees, 0.07 mm, 0.1 mm, and 0.5 mm, respectively, while the POF system was arranged such that the length and the diameter of the light receiving fiber were 60 mm and 1 mm, respectively.

Also, a distance AA (refer to FIG. 5A) between the light emitting element 27a and the light guide rod 141 was set at 3 mm, and a distance between the light emitting element 27a and the light receiving fiber 31 was set also at 3 mm.

The light uptake amounts in Table 1 refer to values detected by an optical power meter with a light receiving diameter of 10 mm at the both end surfaces of the light guide rod 141 and the light receiving fiber 31. As shown in Table 1, the GR system yields improvement defined by a ratio of about 13 compared with the POF system.

Another experiment was conducted based on a practical dimension in view of incorporation in an actual torque measuring device for a rotating body, and the measurement results are shown in Table 2 below.

TABLE 2

|  | Light uptake amount [μW] | Improvement ratio (POF system = 1) |
|---|---|---|
| POF system | 7.9 | 1 |
| GR system | 83.8 | 10.6 |

In this experiment, the GR system was arranged such that the length CC1, the width CC2, and the height CC3 of the light guide rod 141 were 100 mm, 3 mm, and 3 mm, respectively, and the angle DD, the depth EE, the width FF, and the interval GG of the grooves were 72 degrees, 0.07 mm, 0.1 mm, and 0.5 mm, respectively, while the POF system included two light receiving fibers and was arranged such that the length and the diameter of each light receiving fiber were 250 mm and 1.5 mm, respectively, and both end portions thereof were bent downward as shown in FIG. 3.

Also, a distance AA (refer to FIG. 5A) between the light emitting element 27a and the light guide rod 141 was set at 10 mm, while a distance between the light emitting element 27a and the light receiving fiber 31 was set at 3 mm.

The light uptake amounts in Table 2 refer to values detected by an optical power meter with a light receiving diameter of 10 mm at the both end surfaces of the light guide rod 141 and the light receiving fiber 31 in the same way as in Table 1. As shown in Table 2, the GR system yields improvement defined by a ratio of about 10 compared with the POF system.

Now, the measurement results of an experiment conducted for the relation between the diameter of the light receiving fiber and the light uptake amount in the POF system are presented in Table 3 below for reference purposes.

TABLE 3

| Diameter of the light receiving fiber [mm] | Light uptake amount [μW] | | |
|---|---|---|---|
| | $P_L$ | $P_R$ | $P_L + P_R$ |
| 0.25 | 0.2 | 0.2 | 0.4 |
| 0.5 | 1.0 | 1.5 | 2.5 |
| 0.75 | 2.6 | 3.2 | 5.8 |
| 1.0 | 4.9 | 5.3 | 10.2 |
| 1.5 | 9.3 | 13.9 | 23.2 |
| 2.0 | 20.5 | 19.8 | 40.3 |
| 2.5 | 29.0 | 41.7 | 70.7 |
| 3.0 | 47.0 | 32.7 | 79.7 |

In the experiment for Table 3 above, the light receiving fiber had a constant length of 60 mm with a diameter varying from 0.25 mm up to 3.0 mm as shown, and the distance between the light emitting element and the light receiving fiber was set at 3 mm. The light uptake amounts refer to values detected by an optical power meter with a light receiving diameter of 10 mm at the both end surfaces of the light receiving fiber in the same way as in Table 1, where $P_L$ refers to a value detected at one end (left) surface of the light receiving fiber, $P_R$ refers to a value detected at the other end (right) surface, and $P_L+P_R$ refers to a total of both values.

Next, the measurement results of an experiment conducted on various samples prepared with their light guide rods 141 having respective different arrangements about the grooves as the light converting means in the GR system will be presented. The groove arrangements were as shown in Table 4 below.

TABLE 4

| Sample Name/Position/Interval [mm] | | GG/Depth [μm] | EE/Width [μm] | FF/Angle DD [degrees] |
|---|---|---|---|---|
| Sample A | 1 | 0.5 | 47 | 64 | 68.5 |
| | 2 | 0.5 | 36 | 58 | 77.7 |
| | 3 | 0.5 | 26 | 38 | 72.3 |
| Sample B | 1 | 0.5 | 30 | 36 | 62.0 |
| | 2 | 0.5 | 39 | 50 | 65.3 |
| | 3 | 0.5 | 58 | 86 | 73.1 |
| Sample C | 1 | 0.5 | 41 | 54 | 66.7 |
| | 2 | 0.5 | 66 | 100 | 74.3 |
| | 3 | 0.5 | 35 | 63 | 84.0 |

Samples A, B and C were common to one another in specification except the aforementioned groove arrangement of the light guide rod 141 which was set to have a length CC1 of 60 mm, a width CC2 of 1 mm, and a height CC3 of 3 mm.

In Table 4 above, "Position" indicates a position of a groove with respect to the longitudinal direction of the light guide rod 141, where Position 1 refers to the left end portion, Position 2 refers to the middle portion, and Position 3 refers to the right end portion.

The measurement results of the experiment conducted on the samples described above are shown in Table 5 below.

TABLE 5

| Sample Name | Light uptake amount [μW] | | |
| --- | --- | --- | --- |
| | $P_L$ | $P_R$ | $P_L + P_R$ |
| Sample A | 66.6 | 66.7 | 133.3 |
| Sample B | 69.8 | 71.1 | 140.9 |
| Sample C | 77.5 | 80.1 | 157.6 |

In the experiment for Table 5 above, and the distance between the light emitting element 27a and the light guide rod 141 was set at 3 mm. The light uptake amounts refer to values detected by an optical power meter with a light receiving diameter of 10 mm at the both end surfaces of the light guide rod 141 in the same way as in Table 1, where $P_L$ refers to a value detected at the left end surface of the light guide rod 141, $P_R$ refers to a value detected at the right end surface, and $P_L+P_R$ refers to a total of both values.

Next, the measurement results of an experiment conducted on various samples prepared with their light guide rods 141 having respective different lengths (CC1) in the GR system are shown in Table 6 below.

TABLE 6

| Length CC1 [mm] | Light uptake amount [μW] | | |
| --- | --- | --- | --- |
| | $P_L$ | $P_R$ | $P_L + P_R$ |
| 60 | 76.4 | 75.8 | 152.2 |
| 80 | 62.8 | 60.9 | 123.7 |
| 100 | 42.5 | 41.3 | 83.8 |
| 120 | 37.5 | 37.7 | 75.8 |

In the experiment for Table 6 above, the width CC2 and the height CC3 of the light guide rod 141 were both set at 3 mm, the grooves were arranged identical with those of Sample A in Table 4, and the distance AA between the light emitting element 27a and the light guide rod 141 was set at 10 mm. The light uptake amounts refer to values detected by an optical power meter with a light receiving diameter of 10 mm at the both end surfaces of the light guide rod 141 in the same way as in Table 1, where $P_L$ refers to a value detected at the left end surface of the light guide rod 141, $P_R$ refers to a value detected at the right end surface, and $P_L+P_R$ refers to a total of both values.

Next, the measurement results of an experiment conducted on a sample with its light guide rod 141 set at different distances AA from the light emitting element 27a are shown in Table 7 below.

TABLE 7

| Distance AA [mm] | Light uptake amount [μW] | | |
| --- | --- | --- | --- |
| | $P_L$ | $P_R$ | $P_L + P_R$ |
| 1 | 265.4 | 200.3 | 465.7 |
| 3 | 157.2 | 115.4 | 272.6 |
| 5 | 90.0 | 89.8 | 179.8 |
| 7 | 74.5 | 63.2 | 137.7 |
| 9 | 49.6 | 57.2 | 106.8 |
| 10 | 38.2 | 42.7 | 80.9 |
| 11 | 35.8 | 36.3 | 72.1 |

In the experiment for Table 7 above, the length CC1, the width CC2, and the height CC3 of the light guide rod 141 were set at 100 mm, 3 mm and 3 mm, respectively, and the angle DD, the depth EE, the width FF, and the interval GG of the grooves were set at 72 degrees, 0.07 mm, 0.1 mm, and 0.5 mm, respectively. The light uptake amounts refer to values detected by an optical power meter with a light receiving diameter of 10 mm at the both end surfaces of the light guide rod 141 in the same way as in Table 1, where $P_L$ refers to a value detected at the left end surface of the light guide rod 141, $P_R$ refers to a value detected at the right end surface, and $P_L+P_R$ refers to a total of both values.

The light receiving fiber of the POF system and the light guide rod 141 of the GR system exhibited the characteristics as shown in Tables 1 to 7.

In the torque measuring device for a rotating body, which employs the light guide rod 141 (the GR system), variation in light uptake amount was observed in an experiment as shown in Table 8 below in the wake of the light emitting elements 27a to 27n rotating in accordance with the rotation of the rotary section 11, as is the case with the torque measuring device employing the light receiving fiber (the POF system).

TABLE 8

| Off-angle θ [degrees] | Light uptake amount [μW] | | |
| --- | --- | --- | --- |
| | $P_L$ | $P_R$ | $P_L + P_R$ |
| 0 | 49.2 | 48.9 | 98.1 |
| 5 | 50.7 | 44.5 | 95.2 |
| 10 | 51.8 | 45.8 | 97.6 |
| 15 | 55.7 | 58.9 | 114.6 |
| 20 | 60.5 | 76.9 | 137.4 |
| 22.5 | 67.4 | 66.8 | 134.2 |
| 25 | 75.2 | 61.2 | 136.4 |
| 30 | 63.1 | 58.8 | 121.9 |
| 35 | 46.2 | 58.6 | 104.8 |
| 40 | 49.3 | 55.6 | 104.9 |
| 45 | 44.6 | 43.4 | 88.0 |

In the experiment for Table 8 above, the length CC1, the width CC2, and the height CC3 of the light guide rod 141 were set at 100 mm, 3 mm and 3 mm, respectively, and the angle DD, the depth EE, the width FF, and the interval GG of the grooves were set at 72 degrees, 0.07 mm, 0.1 mm, and 0.5 mm, respectively. The light uptake amounts refer to values detected by an optical power meter with a light receiving diameter of 10 mm at the both end surfaces of the light guide rod 141 in the same way as in Table 1, where $P_L$ refers to a value detected at the left end surface of the light guide rod 141, $P_R$ refers to a value detected at the right end surface, and $P_L+P_R$ refers to a total of both values.

In the experiment for Table 8, the light emitting elements 27a to 27n were disposed at the outer circumference of the second flange 14 at an interval of 45 degrees in terms of rotation angle of the rotary section 11 (consequently, eight of the light emitting elements 27 were provided), and the off-angle θ was defined such that the position of, for example, the light emitting element 27a situated at the lowest point, namely closest to the light receiving surface of the light guide rod 141 was 0 degrees.

Table 8 shows that as much as some 50% variation in light uptake amount was caused due to the rotation of the rotary section 11. The variation has an impact on design of an amplifier in a torque calculator which computes torque of the rotary section 11 based on detection results by the optical-electrical signal converters 33a and 33b, and therefore is minimized. The measurement results shown in Table 8 are based on the above-described arrangement of the grooves, where the angle DD, the depth EE, the width FF, and the interval GG of the grooves were set constantly and uniformly at 72 degrees, 0.07 mm, 0.1 mm, and 0.5 mm, respectively. In the present invention, the variation in light uptake amount can be reduced with an optimized groove arrangement, for example by non-uniformly arranging the grooves depending on positions with respect to the longitudinal direction of the light guide rod 141.

Figure 6A:
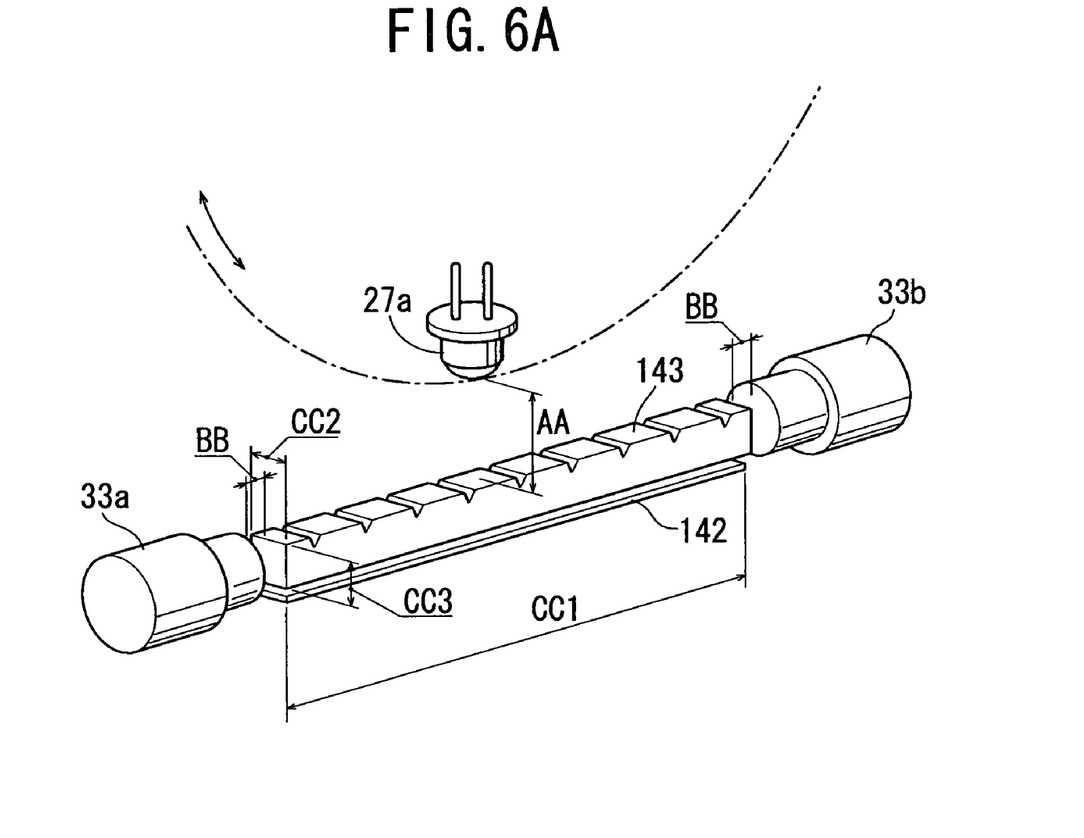
FIG. 6A is a perspective view of a relevant portion of a torque measuring device for a rotating body according to a second embodiment of the present invention.
Figure 6B:
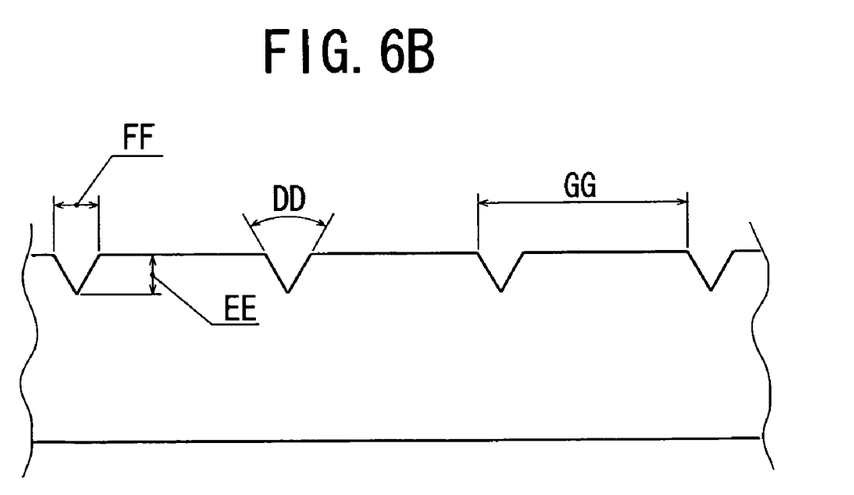
FIG. 6B is a side view of a part of a light guide rod shown in FIG. 6A.

In the first embodiment described above, the grooves as the optical path converting means are formed at a surface of the light guide rod 141 opposite to a surface to receive the optical signal L from the light emitting elements 27*a* to 27*n*. The present invention is not limited to such a structure, and the grooves may alternatively be formed at a surface of a light guide rod to receive the optical signal L, thus building a light guide rod 143 shown in FIGS. 6A and 6B showing a second embodiment of the present invention, where only difference from the first embodiment (FIGS. 5A and 5B) is that the grooves as the optical path converting means are formed at the light receiving surface of the light guide rod 143, and therefore a detailed description thereof will be omitted.

While the specific embodiments have been illustrated and described, numerous modifications come to mind without significantly departing from the spirit of the invention, and the scope of protection is only limited by the scope of the accompanying claims.

What is claimed is:

1. A torque measuring device for a rotating body, the device comprising:
   a rotary section including a first flange provided at a driving side, a second flange provided at a driven side, and a hollow cylinder provided between the first and second flanges;
   a plurality of light emitting elements provided at an outer circumference of the rotary section, and functioning to emit light based on output from each of torque detectors provided at an inner surface of the hollow cylinder thereby sending an optical signal;
   a light conductive member comprising a rod member shaped substantially into a rectangular pole, the conductive member functioning to receive the optical signal at a light receiving surface thereof facing toward the rotary section, and to guide the optical signal along its longitudinal directions, the light conductive member having an optical path converting means formed at one of the light receiving surface and a surface opposite to the light receiving surface and having a plurality of grooves formed in a longitudinal direction of the light conductive member each defining inclined planes with a flat portion defined between adjacent grooves, the grooves having ridges extending in a direction orthogonal to a longitudinal direction of the light conducting member; and,
   a torque calculator to calculate torque of the rotary section based on the optical signal guided by the light conductive member.

2. A torque measuring device for a rotating body, according to claim 1, wherein the plurality of grooves each defining inclined planes have one of a triangular cross section and a trapezoidal cross section.

3. A torque measuring device for a rotating body, according to claim 1, wherein the light receiving surface of the light conductive member and the surface opposite to the light receiving surface are parallel to each other.

4. A torque measuring device for a rotating body, according to claim 1, wherein the light conductive member is attached to a chassis disposed outside the rotary section.

5. A torque measuring device for a rotating body, according to claim 1, wherein a light reflecting member is provided at the surface of the light conductive member opposite to the light receiving surface.

\* \* \* \* \*